B. RINDFLEISCH.
FLOATING TOOL HOLDER.
APPLICATION FILED FEB. 12, 1910.
1,021,848.
Patented Apr. 2, 1912.
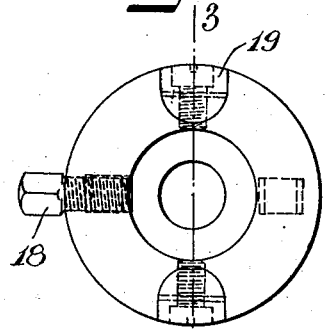
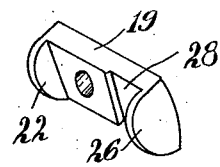
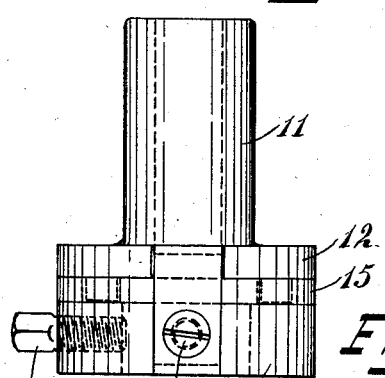
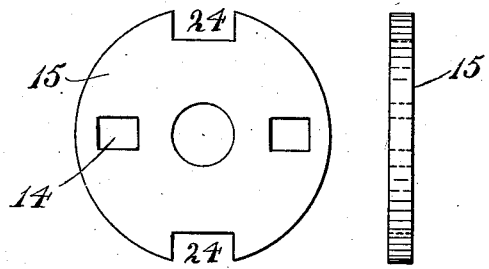
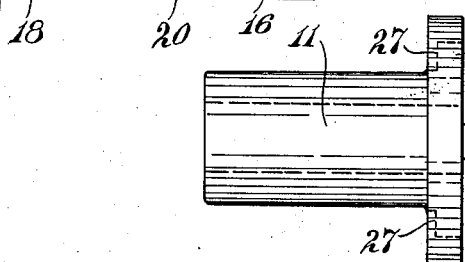
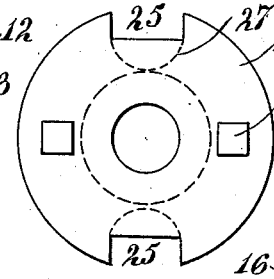
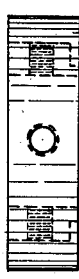
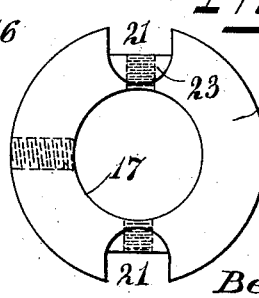
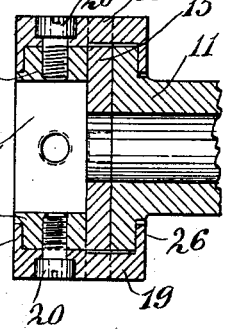
Witnesses:
Inventor:
Benjamin Rindfleisch
By his Attorney,

UNITED STATES PATENT OFFICE.

BENJAMIN RINDFLEISCH, OF CLEVELAND, OHIO, ASSIGNOR TO THE NATIONAL-ACME MANUFACTURING COMPANY, OF CLEVELAND, OHIO, A CORPORATION OF OHIO.

FLOATING TOOL-HOLDER.

1,021,848.      Specification of Letters Patent.      Patented Apr. 2, 1912.

Application filed February 12, 1910. Serial No. 543,591.

*To all whom it may concern:*

Be it known that I, BENJAMIN RINDFLEISCH, a citizen of the United States, residing in Cleveland, in the county of Cuyahoga and State of Ohio, have invented certain new and useful Improvements in Floating Tool-Holders, of which the following is a specification.

This invention relates to tool holders, and has for its object to provide a floating tool holder for use in machine tools.

The object of the invention is to provide means for holding a tool in such manner that vibrations of the stock or of the tool holder spindle one relative to the other will permit the tool to follow the stock incident to such relative vibrations. The tool for this reason may be termed a floating tool, since it is constructed to permit lateral movement of the tool relative to the tool holder spindle.

In the drawings accompanying and forming a part of this specification, Figure 1 is a top view of a holder equipped with my present improvement. Fig. 2 is an end view of the device illustrated in Fig. 1. Fig. 3 is a longitudinal section of the holder. Fig. 4 is a side view of a tool holder head. Fig. 5 is a front view thereof. Fig. 6 is a side view of the body portion of the holder. Fig. 7 is a front view of the body portion. Fig. 8 is a front view, and Fig. 9 is a side view of an intermediate member; and Fig. 10 is a perspective view of the coupling member.

The tool-holder head 11, which is to be mounted upon the tool spindle and secured thereto in such a manner that it will be relatively rigid therewith, is provided with a flange portion 12 which carries a pair of engaging members 13 for entering sockets 14 in the intermediate member 15, see Fig. 8. In the present description when terms of direction are used reference is to be had to the position of the parts in Fig. 2 and to their relative movements. The engaging members 13 in the present illustration are shown as square lugs. The recesses 14 in the intermediate member 15 are shown as rectangular in outline, longer laterally than the lateral dimension of the lugs 13, and from top to bottom of substantially the same dimension as are the lugs. This will permit the intermediate member 15 to move laterally in respect to the member 11; but will constrain such member to move perpendicularly with the head.

The body portion 16 is provided with a tool socket 17 and some suitable tool clamping device, such as a set screw 18. The body portion is secured to the head in such a manner that it will move laterally with the head, and perpendicular independently thereof to a certain extent. There are secured to the body portion a pair of connecting members 19. The present means of connection being illustrated as a screw 20. The connecting member 19 is seated in a recess 21 in the body portion and has a clip portion 22 for extending over the front face of the body portion. The faces are themselves chambered out at 23 so that the face of the holder will be flush. The rearward portion of the connecting member 19 passes through a recess 24 in the intermediate member and a recess 25 in the flange 12 of the head. The sides of the connecting member closely engage the sides of the recesses 21 and 24. A certain amount of lateral play, however, is permitted between the sides of the connecting member and the sides of the recess 28. In the present illustration the recess 25 is wider than the recesses 21 and 24, and the sides of the connecting member are substantially parallel. Reference may be had to Figs. 7, 5 and 8 for showing the difference in width, and reference may be had to Fig. 1 for showing the amount of lateral play. The rearward end of the connecting member has a clip portion 26 and the rear face of the flange 12 is chambered out at 27 for receiving such clip portion. The bottom faces of the recesses 21, 24 and 25 are illustrated as of the same radial distance from the center of the head. The connecting member, however, is illustrated as recessed at 28 so that when this member is securely clamped upon the body portion of the tool holder there can be perpendicular movement of the head and the intermediate member relative to the body portion.

It will readily be seen from the foregoing description and upon inspection of the drawings that the body portion of the tool holder may move in its own plane in two directions at right angles one to the other. This gives it practically the resultant of a compound movement which will permit a tool carried thereby to have a floating movement while at work so that if there is a lateral vibration of the tool spindle; or in the stock being worked upon, the tool can perform its work without injury to the tool or the material being worked upon. The amount of free movement of the body portion relative to its spindle will be determined by the irregularities which experience has shown occur in the material and which it is contemplated to use the device upon. Such irregularities are liable to occur in the stock itself and at times in the rotation of the work holder. At other times they are occasioned by the accumulation of errors in the operations preceding the threading operation. When there is a lateral vibration of the stock being worked upon when this is having screw threads formed upon it, either the screw threading tool or the threads which are being made will be injured. The net result in either instance will be that an imperfect product is formed. The present improvement, however, permits the threading or other tool to float until it finds the center of the stock and then proceeds to perform its duty properly without injury either to itself or to the stock.

Having thus described my invention, I claim:

1. The combination with a tool spindle, of a head, a tool holder and an intermediate member mounted on the head for limiting the free movement in a line transversely of the axis of the spindle, the head being mounted on the intermediate member for a limited free movement in a line transversely of said axis and of the said line of movement of the intermediate member.

2. The combination with a tool spindle provided with a flange, of an intermediate member located adjacent said flange, said intermediate member being provided with a pair of sockets, said flange being provided with lugs entering said sockets, the sockets being longer in the diametrical line of the member in which they are located than are the said lugs for permitting lateral movement of the intermediate member relative to the spindle in one direction transversely of the spindle but restraining lateral movement in other directions, a tool holder, and a connecting member rigidly secured to the tool holder and overlying the intermediate member and the flange and having clips extending over and engaging the rear face of the said flange, the intermediate member having faces located in position for engaging the connecting member for preventing movement of the intermediate member relative to the holder transversely of said diametrical line and having faces for permitting a limited free movement transversely of the said line, and the flange being provided with engaging faces for the connecting member for permitting a limited free movement in the said line and transversely of the said line.

3. The combination with a tool spindle provided with a flange, said flange being provided at each of its opposite sides with a recess, of an intermediate member located adjacent said flange and provided with recesses, said recesses being of the same depth as the recesses in the flange and also being narrower laterally than are the recesses in the flange, said intermediate member being provided with a pair of sockets quartering with the recesses therein, and the said flange being provided with lugs entering said sockets, the sockets being longer in a diametrical line than are the said lugs for permitting lateral movement of the intermediate member relative to the spindle in one direction transversely of the spindle but restraining lateral movement in other directions, a tool holder provided with recesses conforming in size and shape to the recesses in the intermediate member, and a connecting member seated in said recesses and secured to the tool holder and having clips engaging the outer face of the tool holder and the outer face of the said flange and conforming in lateral dimension to the lateral dimensions of the recesses in the tool holder and the intermediate member, and being chambered out radially at its portion overlying the flange and the intermediate member, the organization being such that the tool holder may move transversely of the axis of the spindle and intermediate member in the diametrical line of the said recesses, and the tool holder and intermediate member may move transversely of the axis of the spindle upon the diametrical line of the said lugs.

BENJAMIN RINDFLEISCH.

Witnesses:
W. R. MITCHELL,
S. G. GOODRICH.

---

Copies of this patent may be obtained for five cents each, by addressing the "Commissioner of Patents, Washington, D. C."